(12) United States Patent
Lee et al.

(10) Patent No.: US 9,621,017 B2
(45) Date of Patent: Apr. 11, 2017

(54) VOICE COIL MOTOR, COIL BLOCK FOR VOICE COIL MOTOR, METHOD OF MANUFACTURING THE COIL BLOCK, AND VOICE COIL MOTOR HAVING THE COIL BLOCK

(71) Applicant: LG INNOTEK CO., LTD., Seoul (KR)

(72) Inventors: Seongmin Lee, Seoul (KR); Sangok Park, Seoul (KR); Sangjun Min, Seoul (KR); Taejin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/920,395

(22) Filed: Oct. 22, 2015

(65) Prior Publication Data

US 2016/0043622 A1    Feb. 11, 2016

Related U.S. Application Data

(63) Continuation of application No. 14/135,394, filed on Dec. 19, 2013, now Pat. No. 9,197,121, which is a
(Continued)

(30) Foreign Application Priority Data

Jul. 6, 2010 (KR) .................... 10-2010-0064668
Nov. 18, 2010 (KR) .................... 10-2010-0115166
Dec. 1, 2010 (KR) .................... 10-2010-0121319

(51) Int. Cl.
*G02B 7/02* (2006.01)
*H02K 41/03* (2006.01)
(Continued)

(52) U.S. Cl.
CPC .......... *H02K 41/0356* (2013.01); *G03B 3/10* (2013.01); *G03B 13/34* (2013.01); *H02K 5/04* (2013.01);
(Continued)

(58) Field of Classification Search
CPC . G03B 3/10; G03B 13/34; G03B 3/32; G03B 3/36; H02K 5/04; H02K 41/03;
(Continued)

(56) References Cited

U.S. PATENT DOCUMENTS 7,586,702 B1 * 9/2009 Huang ................... G03B 13/36
                                                          348/208.11
7,782,559 B2 * 8/2010 Huang ..................... G02B 7/08
                                                                310/13

(Continued)

FOREIGN PATENT DOCUMENTS

CN       101546093 A       9/2009
CN       101551500 A      10/2009
(Continued)

OTHER PUBLICATIONS

Office Action dated Dec. 3, 2014 in Chinese Application No. 201110188802.6.

(Continued)

*Primary Examiner* — Loha Ben
(74) *Attorney, Agent, or Firm* — Saliwanchik, Lloyd & Eisenschenk

(57) ABSTRACT

A VCM (voice coil motor) is disclosed, the VCM comprising: a bobbin formed with a support unit protruded from a periphery of a body at a bottom portion of the body, and a recess unit partially removed at the support unit; and a coil block supported by the support unit and including a plurality of coil layers wound at a periphery of the bobbin, wherein first and second distal ends of the coil block pass through the recess unit.

20 Claims, 14 Drawing Sheets

Related U.S. Application Data continuation of application No. 13/177,204, filed on Jul. 6, 2011, now Pat. No. 8,638,510.

(51) Int. Cl.

| | | |
|---|---|---|
| *H02K 41/035* | (2006.01) | |
| *H04N 5/225* | (2006.01) | |
| *H02K 5/04* | (2006.01) | |
| *G03B 3/10* | (2006.01) | |
| *G03B 13/34* | (2006.01) | |
| *G02B 7/04* | (2006.01) | |
| *G02B 7/08* | (2006.01) | |
| *G02B 13/00* | (2006.01) | |

(52) U.S. Cl.
CPC ......... *H02K 41/035* (2013.01); *H04N 5/2252* (2013.01); *H04N 5/2254* (2013.01); *G02B 7/02* (2013.01); *G02B 7/026* (2013.01); *G02B 7/04* (2013.01); *G02B 7/08* (2013.01); *G02B 13/001* (2013.01); *H02K 41/03* (2013.01); *H04N 5/2257* (2013.01)

(58) Field of Classification Search
CPC ............ H02K 41/035; H02K 41/0356; H02K 41/0354; G02B 7/02; G02B 7/04; G02B 7/08; G02B 7/022; G02B 7/026; G02B 13/001; G02B 15/14; G02B 27/646; H04N 5/2252; H04H 5/225; H04H 5/2253; H04H 5/2254; H04H 5/2257; H04H 5/2258
USPC .............. 359/811, 814, 822–824; 310/12.16, 310/12.17, 12.21, 12.22
IPC .................. H02K 5/04, 41/03, 41/035, 41/0356, 41/0354
See application file for complete search history.

(56) References Cited

U.S. PATENT DOCUMENTS

| | | | |
|---|---|---|---|
| 8,368,256 B2 * | 2/2013 | Yoo | .................... H02K 41/0356 310/12.16 |
| 8,498,069 B2 | 7/2013 | Ku et al. | |
| 8,638,510 B2 | 1/2014 | Lee et al. | |
| 2008/0007850 A1 | 1/2008 | Huang | |
| 2011/0291495 A1 | 12/2011 | Lee et al. | |
| 2012/0008221 A1 | 1/2012 | Min et al. | |
| 2012/0013202 A1 | 1/2012 | Lee | |
| 2012/0025633 A1 | 2/2012 | Lee et al. | |
| 2012/0206824 A1 | 8/2012 | Park | |

FOREIGN PATENT DOCUMENTS

| | | |
|---|---|---|
| CN | 101571659 A | 11/2009 |
| CN | 101587221 A | 11/2009 |
| JP | 2006074990 A | 3/2006 |
| JP | 2008197313 A | 8/2008 |
| JP | 2009053573 A | 3/2009 |
| KR | 20080020510 A | 3/2008 |
| KR | 20080076814 A | 8/2008 |
| KR | 20080076841 A | 8/2008 |

OTHER PUBLICATIONS

Office Action dated Jul. 8, 2016 in Korean Application No. 1020100064668.
Office Action dated Nov. 29, 2016 in Korean Application No. 10-2010-0115166.
Office Action dated Dec. 8, 2016 in Korean Application No. 10-2010-0121319.

\* cited by examiner

VOICE COIL MOTOR, COIL BLOCK FOR VOICE COIL MOTOR, METHOD OF MANUFACTURING THE COIL BLOCK, AND VOICE COIL MOTOR HAVING THE COIL BLOCK

CROSS-REFERENCE TO RELATED APPLICATIONS

This application is a continuation of U.S. application Ser. No. 14/135,394, filed Dec. 19, 2013, which is a continuation of U.S. application Ser. No. 13/177,204, filed Jul. 6, 2011, now U.S. Pat. No. 8,638,510, which claims the benefit under 35 U.S.C. §119 of Korean Patent Application Nos. 10-2010-0064668, filed Jul. 6, 2010; 10-2010-0115166, filed Nov. 18, 2010; and 10-2010-0121319, filed Dec. 1, 2010, which are hereby incorporated by reference in their entirety.

BACKGROUND OF THE DISCLOSURE

Field of the Invention

The present disclosure relates to a voice coil motor, a coil block for voice coil motor, a method of manufacturing the coil block and a voice coil motor having the coil block.

Discussion of the Related Art

Recently, a small optical device such as a super-small digital camera on a mobile phone or a high resolution digital camera has been developed and is formed with an actuator for adjusting magnification and focus. The camera on the mobile phone or the digital camera recently employs an actuator such as a VCM (voice coil motor) on a wide range base.

The conventional super-small digital camera on the mobile phone is such that it is impossible to adjust a gap between an image sensor and lens, and a lens driving device such as a VCM for adjusting the gap between the image sensor and the lens has been developed to allow the super-small digital camera to capture an improved image.

The VCM is a motor that uses a force from a magnetic field generated by a magnet and a magnetic field generated by a coil block facing the magnet, such that the VCM is adequate in adjusting a gap between a lens and an image sensor in a camera module.

The VCM includes a cylindrical bobbin mounted therein with a lens, and a coil block wound with a coil at a periphery of the bobbin. A conventional VCM includes a cylindrical bobbin mounted therein with a lens, and a coil block wound with a coil at a periphery of the bobbin. The conventional VCM is formed in such a manner that the coil-wound cylindrical coil block is coupled to the bobbin or a coil is wound on the periphery of the bobbin.

In a case the coil is wound on the periphery of the bobbin to form the coil block, there is a limitation in winding the coil, because the coil must be wound in even layers by alternatively winding the coil from a peripheral bottom end to a peripheral upper end of the bobbin and from the peripheral upper end to the peripheral bottom end of the bobbin.

In a case the coil is wound in the even layers, problems arise that the wound coil is easily unraveled, and it is difficult to discern which line is a winding start line and which line is a winding end line. In order to enhance the performance of VCM, many researches are being waged to improve a magnet generating a magnetic field and a coil block generating a magnetic field that reacts to the magnetic field generated by the magnet.

BRIEF SUMMARY

The present disclosure is directed to cope with the abovementioned problems and to provide a VCM (voice coil motor) configured to prevent a wound coil from being unraveled and to easily discern a winding start line and a winding end line.

The present disclosure is to provide a VCM configured to prevent wires of coil from being unraveled and to inhibit the coil from being intervened by constituent parts, by improving structures of coil wound on a bobbin and the bobbin.

The present disclosure is to provide a coil block for voice coil motor configured to generate magnetic fields of mutually different directions, albeit being wound with one wire, a method of manufacturing the coil block and a voice coil motor having the coil block.

Technical problems to be solved by the present disclosure are not restricted to the abovementioned description, and any other technical problems not mentioned so far will be clearly appreciated from the following description by the skilled in the art.

In one general aspect of the present disclosure, there may be provided a VCM (voice coil motor), the VCM comprising: a bobbin formed with a support unit protruded from a periphery of a body at a bottom portion of the body and a recess unit partially removed at the support unit; first and second elastic members each oppositely arranged at a bottom surface of the bobbin to support the bobbin; and a coil block supported by the support unit and including a plurality of coil layers wound at a periphery of the bobbin, wherein first and second distal ends of the coil block are connected to the first and second elastic members through the recess unit.

In some exemplary of the present invention, the bobbin may be further formed with a bobbin groove at the periphery of the body.

In some exemplary of the present invention, the bobbin groove may be formed in a lateral portion of the recess unit.

In some exemplary of the present invention, the support unit may be protruded along the periphery of the body in a rib shape.

In some exemplary of the present invention, the support unit may be intermittently protruded in plural number along the periphery of the body.

In some exemplary of the present invention, the bobbin may be further formed with a concave exposure unit from the periphery of the body exposed by the recess unit.

In some exemplary of the present invention, the bobbin may be further formed with a guide lug at a position corresponding to that of the recess unit.

In some exemplary of the present invention, the guide lug may be formed between the bobbin groove and the recess unit.

In some exemplary of the present invention, an upper surface of the guide lug may be parallel with the support unit and may be lower in height than an upper surface of the support unit.

In some exemplary of the present invention, the bobbin may further include at least two bosses formed at a bottom surface of the body to fix the first and second elastic members.

In some exemplary of the present invention, the bobbin may formed at an external surface with curvature units and planar units, and the curvature units and planar units may be alternatively formed at the external surface.

In some exemplary of the present invention, the bobbin groove may be formed at an area where the curvature units and planar units are joined.

In some exemplary of the present invention, the second distal end may be connected to the second elastic member through the bobbin groove and the cut-out unit, when a coil block includes an odd number of coil layers.

In another general aspect of the present disclosure, there may be provided a VCM, the VCM comprising: a bobbin formed with a support unit protruded from a periphery of a body at a bottom portion of the body, and a recess unit partially removed at the support unit; and a coil block supported by the support unit and including a plurality of coil layers wound at a periphery of the bobbin, wherein first and second distal ends of the coil block pass through the recess unit.

In some exemplary of the present invention, the support unit may be protruded along the periphery of the body in a rib shape.

In some exemplary of the present invention, the support unit may be intermittently protruded in plural number along the periphery of the body.

In some exemplary of the present invention, the bobbin may be further formed with a concave exposure unit from the periphery of the body exposed by the recess unit.

In some exemplary of the present invention, the bobbin may be formed at an external surface with curvature units and planar units, the curvature units and planar units being alternatively formed at the external surface.

In some exemplary of the present invention, the recess unit may be formed at an area corresponding to the planar unit.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Figure 1:
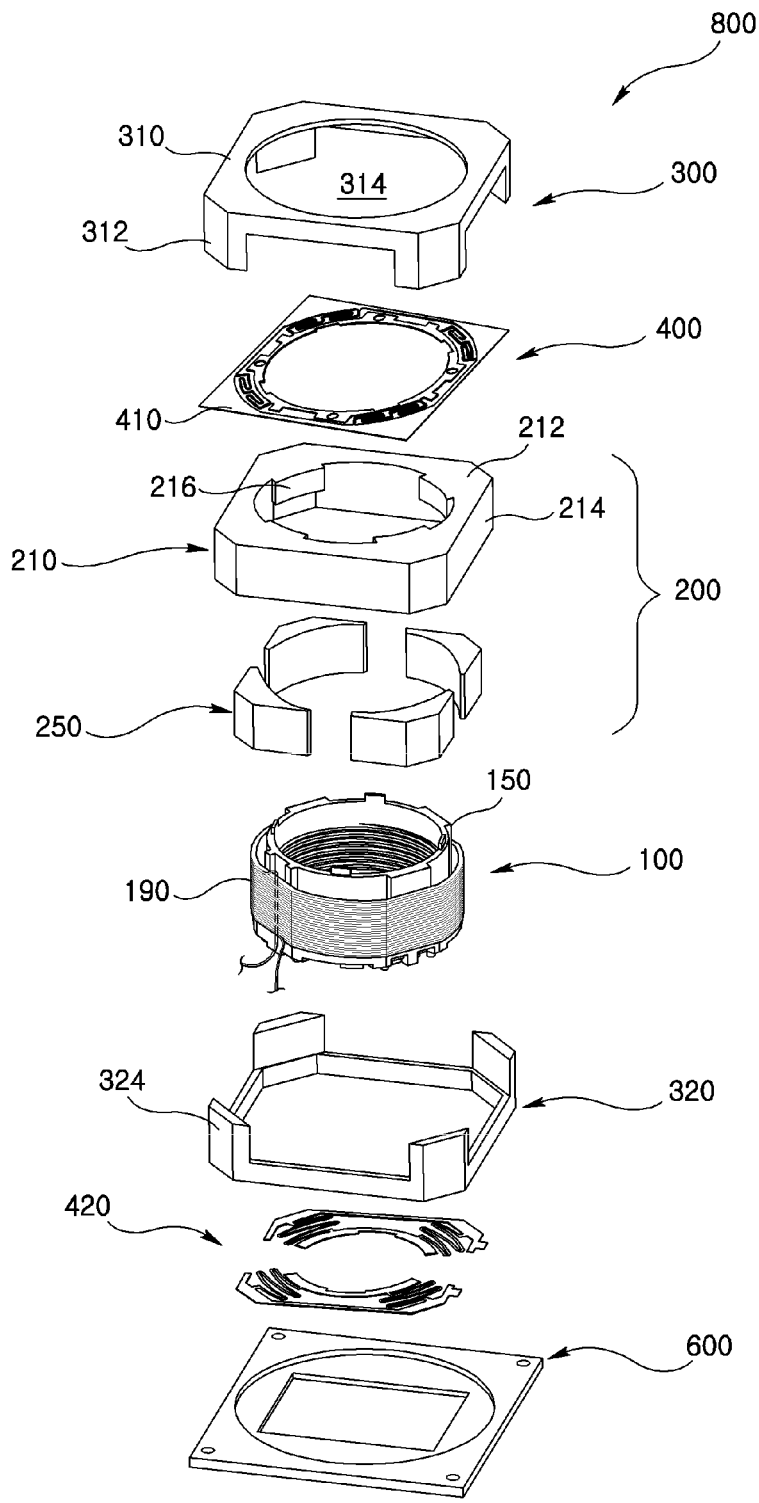
FIG. 1 is an exploded perspective view illustrating an entire configuration of a VCM according to a first exemplary embodiment of the present disclosure.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges from less than one percent to ten percent.

Figure 2:
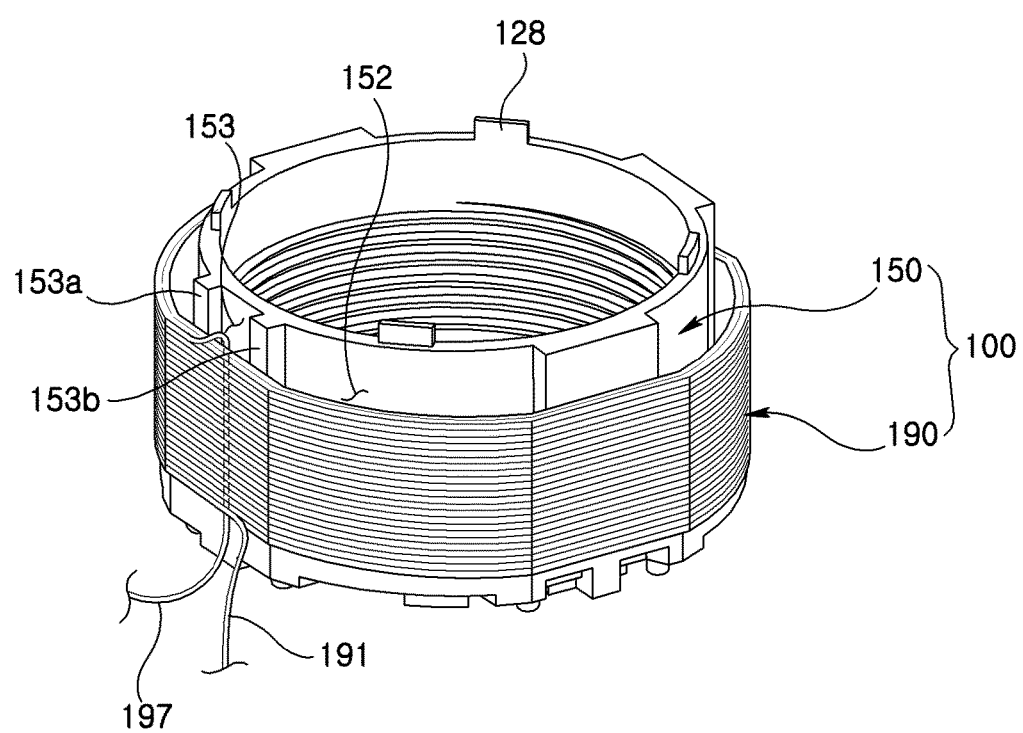
FIG. 2 is a perspective view illustrating a bobbin and a coil block assembled on the bobbin of FIG. 1.
Figure 3:
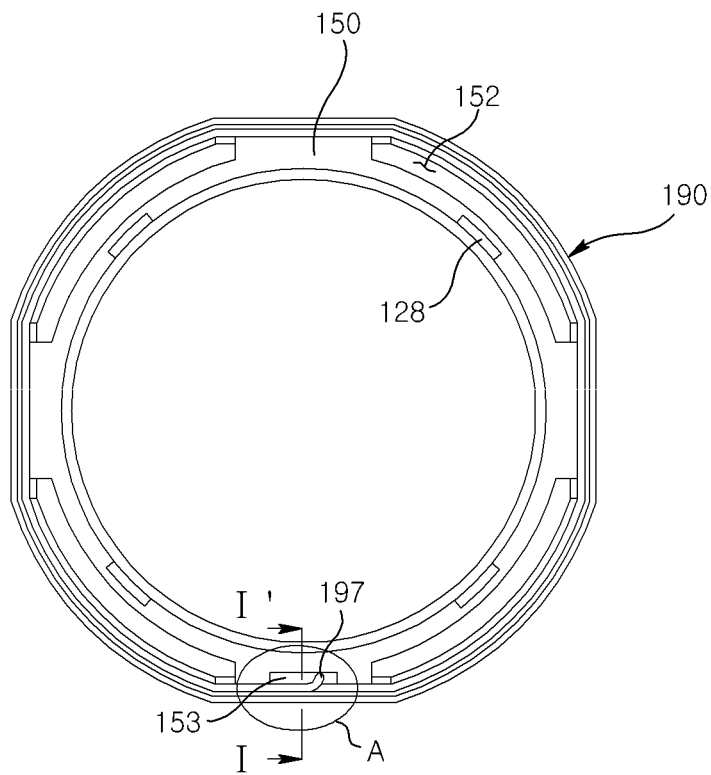
FIG. 3 is a plan view of FIG. 2.

FIG. 1 is an exploded perspective view illustrating an entire configuration of a VCM according to a first exemplary embodiment of the present disclosure, FIG. 2 is a perspective view illustrating a bobbin and a coil block assembled on the bobbin of FIG. 1, FIG. 3 is a plan view of FIG. 2.

Figure 4:
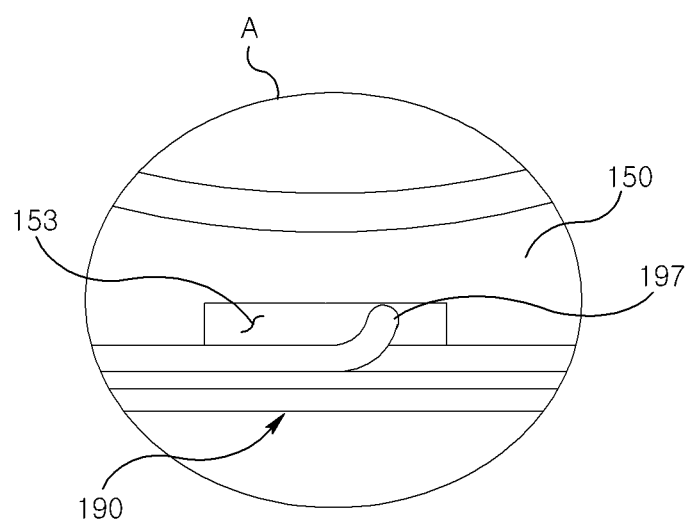
FIG. 4 is an enlarged view of 'A' part of FIG. 3.
Figure 5:
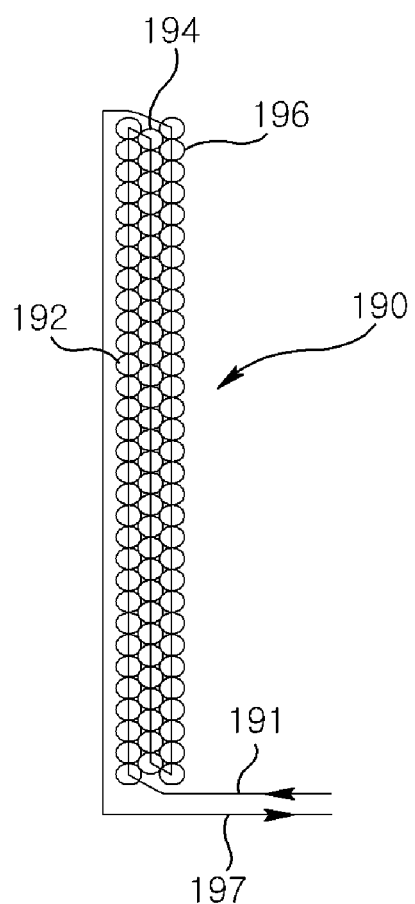
FIG. 5 is a cross-sectional view illustrating a coil block of FIG. 3 cut along line 1-1'.

FIG. 4 is an enlarged view of 'A' part of FIG. 3, and FIG. 5 is a cross-sectional view illustrating a coil block of FIG. 3 cut along line 1-1'.

Referring to FIGS. 1 through 5, a VCM (800) includes a rotor (100), a stator (200), cases (310, 320, 330) and elastic members (410, 420, 430). The VCM (800) may further include a base plate (600).

Referring to FIG. 2, the rotor (100) includes a bobbin (150) and a coil block (190). The bobbin (150) takes the shape of hollow holed cylinder for accommodating a lens (not shown). An inner surface of the bobbin (150) for accommodating the lens is formed with a female screw unit to which a lens fixing member (not shown) is coupled, and the lens fixing member is coupled to the lens. Alternatively, it should be also appreciated that the lens is directly coupled to the female screw unit of the bobbin (150). A peripheral bottom distal end of the bobbin (150) is formed with a sill for supporting a coil block (190, described later).

A periphery of the bobbin (150) is formed with yoke accommodation grooves (152) from an upper end of the bobbin (150) to a direction facing a bottom end opposite to the upper end of the bobbin (150). Four yoke accommodation grooves (152) may be formed on the periphery of the bobbin (150) each at a predetermined gap, for example. The yoke accommodation groove formed at the bobbin (150) is inserted by a part of the yoke (210, described later).

A coil discharge unit (153) is formed that is extended from the upper peripheral upper distal end of the bobbin (150) to the bottom peripheral bottom distal end of the bobbin (150) opposite to the upper peripheral upper distal end of the bobbin (150). The coil discharge unit (153) may be formed among the yoke accommodation grooves (152) of the bobbin (150).

The coil discharge unit (153) is used as a passage for discharging a finishing line (197), for example, a distal end of the coil forming the coil block (190, described later), from the upper distal end of the bobbin (150) to a bottom distal end of the bobbin (150), in a case where the finishing line (197) is positioned at the upper distal end of the coil block (190).

The coil discharge unit (153) may be a groove formed from the periphery of the bobbin (150). Alternatively, it should be appreciated that first and second discharge lugs (153a, 153b), each discrete at a predetermined gap from the periphery of the bobbin (150), and protruded in parallel, may be formed in order to form the coil discharge unit (153). Meanwhile, the upper distal end of the bobbin (150) may be formed with at least one boss (128) for being coupled to an elastic member (described later).

The coil block (190) is arranged on a hitching sill formed at the bobbin (150), and may take the shape of a cylinder wound with a coil. The coil block (190) according to the exemplary embodiment of the present disclosure includes a plurality of layers on which coils are wound. That is, the coil block (190) includes layers of wound coils in even numbers or odd numbers depending on thickness and resistance value of the VCM (800).

A coil block (190) according to prior art includes a plurality of layers wound with coils in even numbers only, to make it difficult to adjust a coil resistance, whereas the coil block (190) according to the exemplary embodiment of the present disclosure can be made of layers wound with coils in even numbers or odd numbers to enable an accurate adjustment of coil resistance.

In the first exemplary embodiment of the present disclosure, a start line (191) of coil and a finishing line (197) of coil for forming the coil block (190) must be arranged at the bottom distal end of the bobbin (150) for being electrically connected to an elastic member (420, described later).

Now, a coil block (190) of three layers, for example, formed by winding coils on the bobbin (150) will be described hereinafter.

Referring to FIG. 5, a start line (191) of a first coil layer (192) is arranged on a hitching sill formed at the periphery bottom distal end of the bobbin (150), and the first coil layer (192) is wound from the start line (191) to the upper distal end of the bobbin (150). For example, the start line (191) of coil starting to be wound on the first coil layer (192) in the coil block (190) may be positioned at a place corresponding to that of the coil discharge unit (153). The start line (191) of the coil block (190) may be secured to the hitching sill and/or to the periphery of the bobbin (150) by an adhesive.

A second coil layer (194) is extended from the first coil layer (192) arranged on the upper distal end of the bobbin (150), and wound toward the bottom distal end of the bobbin (150) from the upper distal end of the bobbin (150). A third coil layer (196) is extended from the second coil layer (194) arranged on the bottom distal end of the bobbin (150), and wound from the bottom distal end of the bobbin (150) toward the upper distal end of the bobbin (150).

In a case the three layers form the coil block (190), a distal end of the coil forming the third coil layer (196) is positioned on the upper distal end of the bobbin (150). The finishing line (197), which is a part of the third coil layer (196) of the coil block (190), passes a space formed by the first coil layer (192) and the coil discharge unit (153) formed at the bobbin (150) and is discharged to the bottom distal end of the bobbin (150). The finishing line (197) of the coil block (190) having passed the coil discharge unit (153) may be secured by an adhesive provided from the coil discharge unit (153).

The stator (200) includes a yoke (210) and a magnet (250). The yoke (210) includes an upper plate (212), a lateral plate (214) and a yoke unit (216). The upper plate (212) of the yoke (210) may take the shape of a square plate, when viewed from a top plan view, and is centrally formed with a circular opening for exposing the upper distal end of the bobbin (150).

The lateral plate (214) is extended to a direction parallel with the periphery of the bobbin from four edges of the upper plate (212), and integrally formed with the four edges of upper plate (212). The yoke unit (216) is protruded from an inner lateral surface of the upper plate (212) formed by the circular opening of the upper plate (212) to a direction facing the bottom distal end of the bobbin (150). The yoke unit (216) is arranged at a place farther inside than a space formed by the yoke accommodation groove (152) and the coil block (190), where the yoke unit (216) is formed with a size accommodatable inside the yoke accommodation groove (152).

Magnets (250) are arranged at an inner space formed by the upper plate (212) of the yoke (210) and the lateral plate (214), Each magnet (250) faces the coil block (190).

The bobbin (150) may be moved upwards by a force generated by magnetic field generated by the magnets (250) and a magnetic field generated by the coil block (190). At this time, the moved distance of the bobbin (150) can be accurately adjusted by a current applied to the coil block (190).

An elastic member (400) elastically supports an upper distal end and a bottom distal end of the bobbin (150) transmitted upwards by the magnet (250) and the coil block (190). The elastic member (400) in the present exemplary embodiment of the present disclosure includes a first elastic member (410) and a second elastic member (420). The first and second elastic members (410, 420) may be leaf springs each having a thin thickness, for example.

The first elastic member (410) is arranged on an upper surface of the yoke (210), and the second elastic member (420) is formed at a portion corresponding to a bottom distal end of the bobbin (150). Two second elastic members (420) may be formed, for example, and a driving signal provided to the coil block (190) is applied to the second elastic member (420).

In the present exemplary embodiment of the present disclosure, the start line (191) and the finishing line (197) of the coil block (190) are electrically connected to the two second elastic members (420).

A case (300) includes an upper case (310) and a bottom case (320). The upper case (310) includes a coupling pillar (312) protruded from four corners of the upper plate. The upper case (310) is arranged on an upper surface of the yoke (210), and the first elastic member in the elastic member (400) is interposed between the upper case (310) and the yoke (210).

The upper plate of the upper case (310) takes the shape of a square plate when viewed from a top plan view, and is centrally formed with a circular opening (314) for exposing the bobbin (150).

The coupling pillar (312) is protruded in parallel with the bobbin (150) from the four corners of the upper plate, and is coupled to the bottom case (320, described later). The bottom case (320) includes pillars (324) coupled to each coupling pillar (312) of the upper case (310).

As noted from the foregoing, there is an advantageous effect in that the VCM can be miniaturized/slimmed and resistance value can be easily controlled during coil design by forming a coil discharge unit on a periphery of a bobbin wound with coil block from an upper end to a bottom end of the bobbin, and winding the coil in odd numbers by discharging a distal end of the coil disposed at an upper end of the coil block to a bottom end through the coil discharge unit.

There is another advantageous effect in that a distal end of coil arranged on the upper end of the coil block by being wound in a last layer is discharged to the bottom end of the bobbin through the coil discharge unit, whereby the coil wound on the bobbin is prevented from being unraveled when the bobbin is vertically moved.

Now, a second exemplary embodiment of the present disclosure will be described with reference to the accompanying drawings.

In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 6:
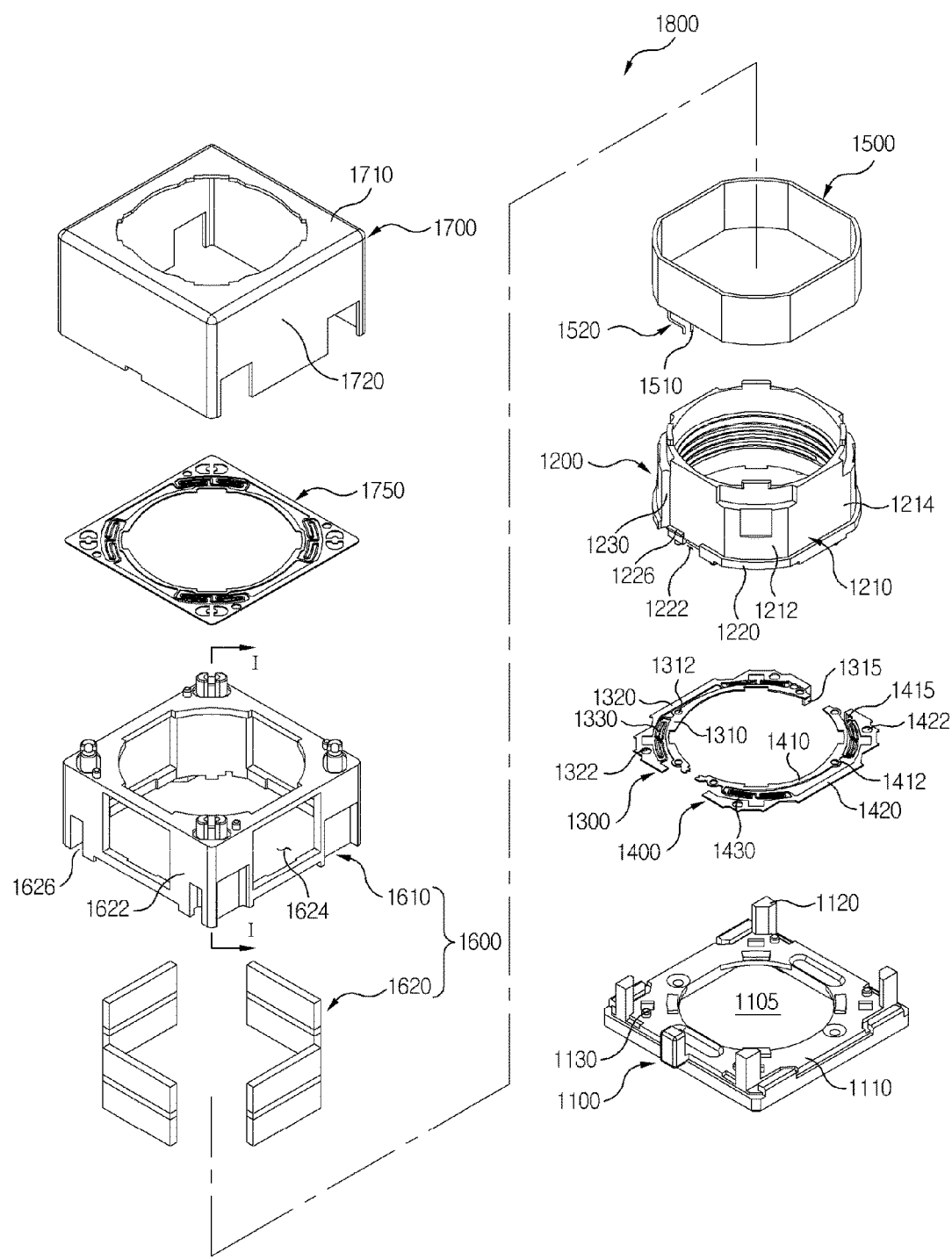
FIG. 6 is an exploded perspective view of a VCM according to a second exemplary embodiment of the present disclosure.
Figure 7:
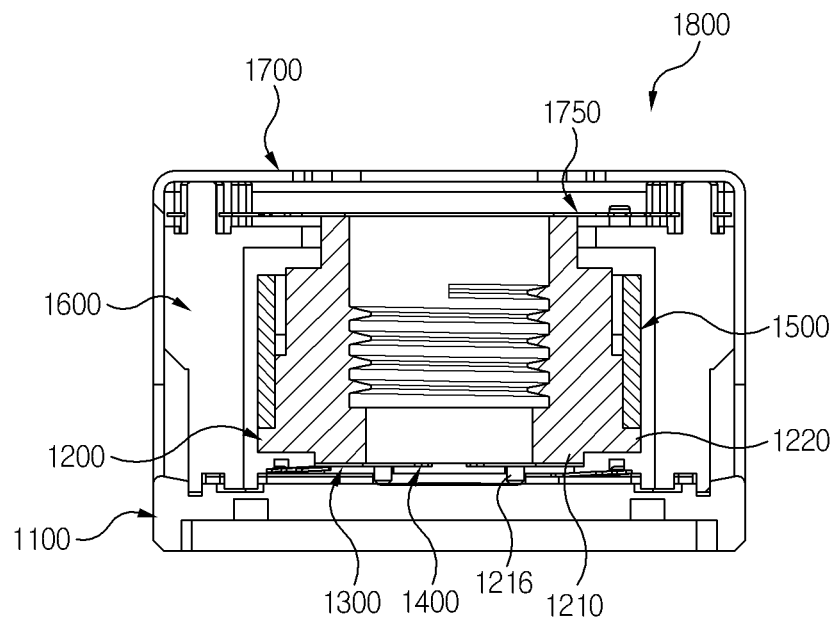
FIG. 7 is an assembled cross-sectional view of FIG. 6.

FIG. 6 is an exploded perspective view of a VCM according to a second exemplary embodiment of the present disclosure, and FIG. 7 is an assembled cross-sectional view of FIG. 6.

Referring to FIGS. 6 and 7, a VCM (1800) includes a base (1100), a bobbin (1200), first and second elastic members (1300, 1400), a coil block (1500), a stator (1600) and a cover can (1700). The VCM (1800) may further include a third elastic member (1750)

The base (1100) functions to secure the bobbin (1200, described later), the first and second elastic members (1300, 1400), a stator (1600) and a cover can (1700). The base (1100) may take the shape of a rectangular parallelepiped plate centrally formed with an opening (1105). The base (1100) is formed at a rear surface thereof with an infrared (IR) filter and an image sensor module, where the image sensor module generates an image corresponding to an external light incident through the opening (1105) of the base (1100).

Four corners of an upper surface (1110) of the base (1100) are formed with four coupling pillars (1120) protruded to a direction perpendicular to the each upper surface (1110). Furthermore, the upper surface (1110) of the base (1100) is formed with bosses (1130) coupled to the first and second elastic members (1300, 1400, described later).

Figure 8:
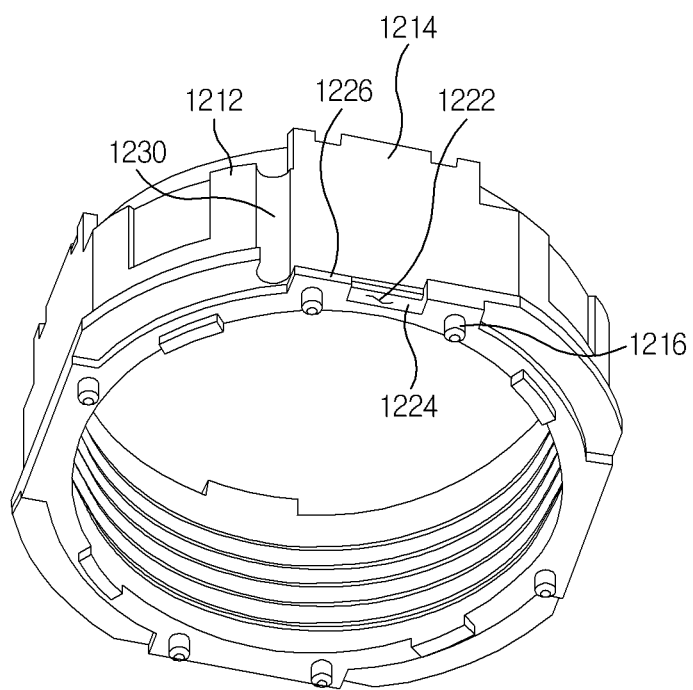
FIG. 8 is a bottom perspective view of a bobbin of FIG. 6.

FIG. 8 is a bottom perspective view of a bobbin of FIG. 6.

Referring to FIGS. 6 and 8, the bobbin (1200) adjusts a gap between a lens secured therein and an image sensor module secured at a rear surface of the base (1100). The bobbin (1200) includes a body (1210), a support unit (1220) and a bobbin groove (1230).

The body (1210) takes the shape of a hollow-holed cylinder through which external light can pass, for example. In the second exemplary embodiment of the present disclosure, the hollow hole of the body (1210) may take various shapes, for example, a cylindrical shape, a square shape and a polygonal shape.

The body (1210) is externally formed with curvature units (1212) and planar units (1214). Each of the curvature units (1212) and planar units (1214) is alternatively formed at the external surface of the body (1210). In the second exemplary embodiment of the present disclosure, the body (1210) is alternatively formed with four curvature units (1212) and four planar units (1214).

Referring to FIGS. 7 and 8, a bottom distal end of the body (1210) of the bobbin (1200) facing the upper surface (1110) of the base (1100) is protruded with a plurality of bosses (1216), and the bosses (1216) are fixed with first and second elastic members (1300, 1400, described later). The bosses (1216) face the upper surface (1110) of the base (1100).

The support unit (1220) is formed at a bottom external surface of the body (1210) and serves to support a bottom surface of the coil block (1500, described later). The support unit (1220) is protruded along the bottom external surface of the body (1210). The support unit (1220) may be protruded from the bottom external surface of the body (1210) in the shape of a rib.

Although the support unit (1220) is described to be protruded from the bottom external surface of the body (1210) in the shape of a rib according to the second exemplary embodiment of the present disclosure, the configuration is not limited thereto. It should be apparent that a plurality of support units (1220) may be intermittently protruded from the bottom external surface of the body (1210).

In the second exemplary embodiment of the present disclosure, the rib-shaped support unit (1220) may be formed with a support unit-partially incised or removed cut-out unit (1222), through which a first distal end or a second distal end of the coil block (1500, described later) passes.

A position facing the cut-out unit (1222) is formed with a guide lug (1226). An upper surface of the guide lug (1226) is lower than the upper surface of the support unit (1220), and the guide lug (1226) is formed in parallel with the support unit (1220).

The bobbin (1200) may include an exposure unit (1224) concavely formed from the periphery of the body (1210) exposed by the cut-out unit (1222) for increasing an exposure area of a portion electrically connected to the first and second distal ends in the first and second elastic members (1300, 1400, described later).

The bobbin groove (1230) is formed to a direction facing an upper end of external surface of the body (1210) and to a direction facing a bottom end opposite to the upper end. The bobbin groove (1230) may take the shape of a groove formed at the external surface of the body (1210). The bobbin groove (1230) is formed with a size appropriate for a distal end of the coil block (1500, described later) to pass through. The bobbin groove (1230) may be formed at a portion where the curvature unit (1212) and the planar unit (1214) of the body (1210) meet.

Figure 9:
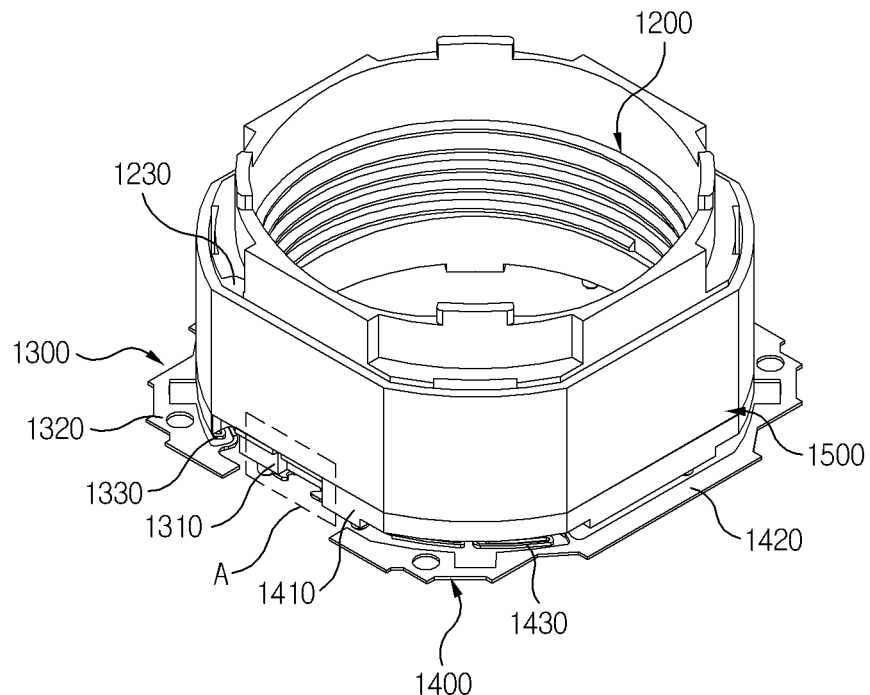
FIG. 9 is a perspective view of bobbin, first and second elastic members and coil block of FIG. 8.
Figure 10:
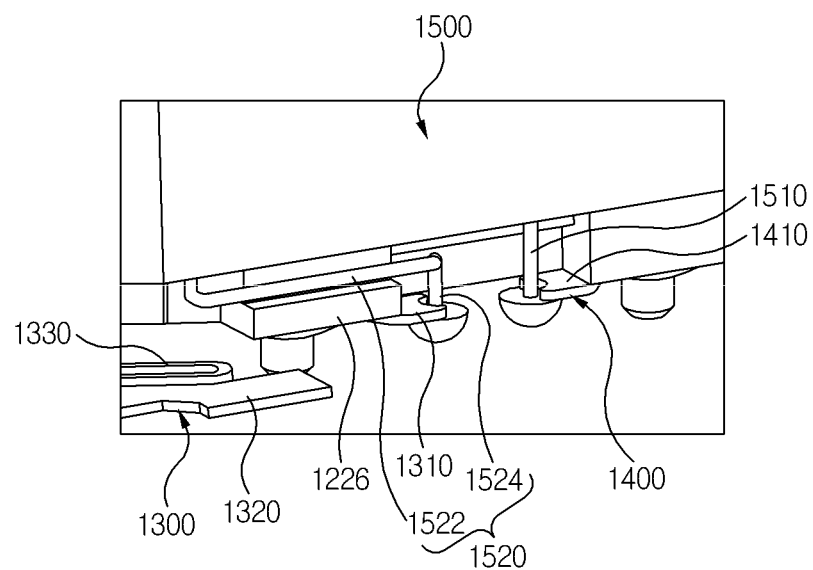
FIG. 10 is an enlarged view of 'A' part of FIG. 9.

FIG. 9 is a perspective view of bobbin, first and second elastic members and coil block of FIG. 8, and FIG. 10 is an enlarged view of 'A' part of FIG. 9.

Referring to FIGS. 6, 9 and 10, the first and second elastic members (1300, 1400) are arranged at a bottom surface of the bobbin (1200), and serve to elastically support the bobbin (1200). The first and second elastic members (1300, 1400) disposed at the bottom surface of the bobbin (1200) are discretely formed to prevent from being electrically connected.

The first and second elastic members (1300, 1400) are diagonally formed based on a center of the bobbin (1200). Each of the first and second elastic members (1300, 1400) includes inner elastic units (1310, 1410), external elastic units (1320, 1420) and connection elastic units (1330, 1430).

Each of the inner elastic units (1310, 1410) takes the shape of a semi-circle plate when viewed from a top plan view. The inner elastic units (1310, 1410) are formed with through holes (1312, 1412) coupled to a boss (1216) formed at a bottom surface of the bobbin (1200), and secured to the bottom surface of the bobbin (1200).

The external elastic units (1320, 1420) are disposed outside of the inner elastic units (1310, 1410), and each of the external elastic units (1320, 1420) takes the shape of a semi-circular plate when viewed in a top plan view. The external elastic units (1320, 1420) are formed with through holes (1322, 1422) coupled to a boss (1130) formed on the upper surface of the base (1100). The external elastic units (1320, 1420) are formed with terminal units (1315, 1415) for receiving a power from an outside, and the terminals (1315, 1415) are electrically connected to an external circuit board through the base (1100).

The connection elastic units (1330, 1430) elastically connect the inner elastic units (1310, 1410) to the external elastic units (1320, 1420), and each of the external elastic units (1320, 1420) takes the shape of a zigzag when viewed in a top plan view.

Meanwhile, an upper distal end of the bobbin (1200) may be elastically coupled to a third elastic member (1750).

Figure 11:
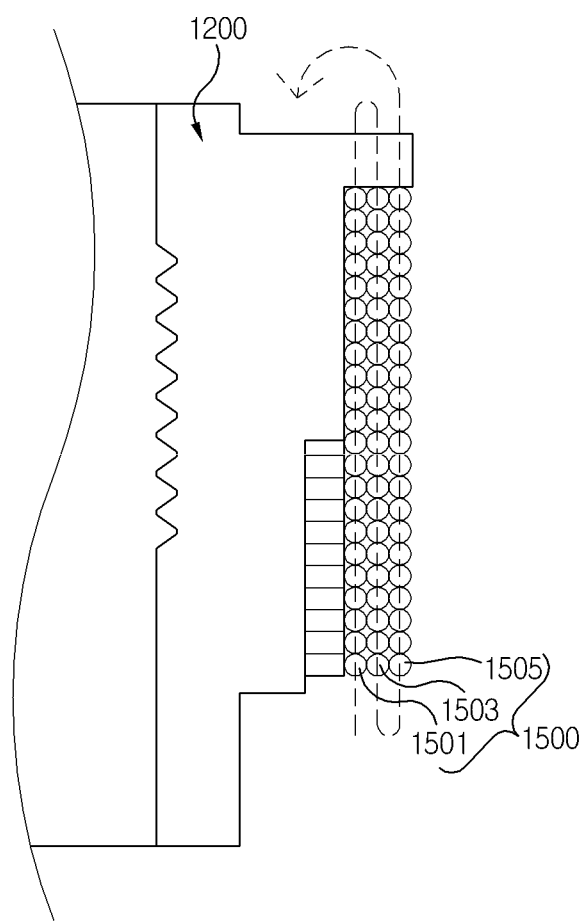
FIG. 11 is a cross-sectional view of a coil block arranged on a bobbin of FIG. 10.

FIG. 11 is a cross-sectional view of a coil block arranged on a bobbin of FIG. 10.

Referring to FIGS. 10 and 11, the coil block (1500) takes the shape of a cylinder inserted into the periphery of the body (1210) of the bobbin (1200), and is arranged on the support unit (1220) formed at the bottom peripheral surface of the body (1210). The coil block (1500) is formed by being wound with a wire coated with an insulation resin such as enamel resin in a cylindrical shape. The coil block (1500) is wound in a direction parallel with an upper surface of the support unit (1220) of the bobbin (1200).

Now, any one distal end of the coil block (1500) is defined as a first distal end (1510) and a distal end opposite to the first distal end is defined as a second distal end (1520).

The coil block (1500) is formed with a plurality of layers, and is formed with 2 N+1 coil layers, where N is a natural number.

To be more specific, the coil block (1500) is formed with three or more odd numbers of layers. In the present exemplary embodiment of the present disclosure, caliber of a lens mounted at the bobbin (1200) can be further enhanced by forming the coil block (1500) in odd numbers of layers.

The coil block (1500) includes a first coil layer (1501), a second coil layer (1503) and a third coil layer (1505).

The first coil layer (1501) formed with the first distal end (1510) is formed from a portion where the support unit (1220) of the bobbin (1200) and the periphery of the body (1210) meet, and is formed with a wire wound to the upper peripheral surface of the body (1210) along the periphery of the body (1210).

The second coil layer (1503) is arranged on the first coil layer (1501) and is formed with a wire wound to the support unit (1220) from the upper peripheral surface of the bobbin (1200). The third coil layer (1505) is arranged on the second coil layer (1503) and is formed by being wound with a wire to the upper peripheral surface of the bobbin (1200) from the support unit (1220). The second distal end (1520) formed at the third coil layer (1505) is inserted into a groove (1230) formed at the body (1210) of the bobbin (1200) and passes the cut-out unit (1222).

The second distal end (1520) formed at the third coil layer (1505) that has passed the cut-out unit (1222) by being inserted into the bobbin groove (1230) includes a first bent unit (1522) bent in parallel with the support unit (1220), and a second bent unit (1534) bent to a bottom from the first bent unit (1522), as illustrated in FIG. 10. The first bent unit (1522) is guided by the guide lug (1226) formed at the cut-out unit (1522) of the bobbin (1200).

The first distal end (1510) of the coil block (1500) is electrically connected to the inner elastic unit (1410) of the second elastic member (1400) via a solder, and the second distal end (1520) of the coil block (1500) is electrically connected to the inner elastic unit (1410) of the first elastic member (1300) via a solder.

In the present exemplary embodiment of the present disclosure, a fatal defect of the wire of the coil block (1500) being unraveled can be prevented by coupling the second distal end (1520) of the coil block (1500) to the first elastic member (1300) through the bobbin groove (1230).

A driving signal applied to the first and second elastic members (1300, 1400) is applied to the first and second distal ends (1510, 1520) of the coil block (1500), whereby a magnetic field is generated by a current flowing in the wound coil block (1500).

The stator (1600) includes an integrated housing (1610) and a magnet (1620). The magnet (1620) is arranged in opposition to the coil block (1500) wound on the bobbin (1200), where a plurality of magnets is formed.

In the present exemplary embodiment of the present disclosure, the magnet (1620) includes a flat magnet shaped of a plate, and each of the four magnets (1620) is perpendicularly arranged in opposition to the coil block (1500). The integrated housing (1610) serves to fix the magnet (1620) to a predetermined position, and includes a plurality of lateral surfaces (1622) arranged in parallel with the periphery of the body (1210) of the bobbin (1200), and each of the lateral surfaces (1622) is formed with a magnet accommodation hole (1624) for accommodating the magnet (1620).

Meantime, the lateral surface (1622) of the integrated housing (1610) is formed with coupling grooves (1626) coupled to coupling pillars (1120) formed at each corner of the upper surface (1110) of the base (1100). The cover can (1700) includes an upper plate (1710) and a lateral plate (1720).

The upper plate (1710) includes an opening corresponding to a hollow hole of the bobbin (1200), and the lateral plate (1720) is extended to a direction encompassing the magnet (1620) of the integrated housing (1610) from each edge of the upper plate (1710). In the present exemplary embodiment of the present disclosure, a rear surface opposite to a front surface of the magnet (1620) facing the coil block (1500) is brought into contact with an inner lateral surface of the lateral plate (1720) of the cover can (1700).

In the present exemplary embodiment of the present disclosure, the upper plate (1710) and the lateral plate (1720) may be integrally formed. The lateral plate (1720) of the upper plate (1710) is secured at the base (1100).

As noted from the foregoing, the second exemplary embodiment of the present disclosure is advantageous in that size of the lens mounted at the bobbin can be further increased, unraveling of coil forming the coil block can be prevented, and interference of the coil block with the constituent elements about the coil block can be prevented to improve image quality and driving performances.

Now, a third exemplary embodiment of the present disclosure will be described in detail with reference to the accompanying drawings.

In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 12:
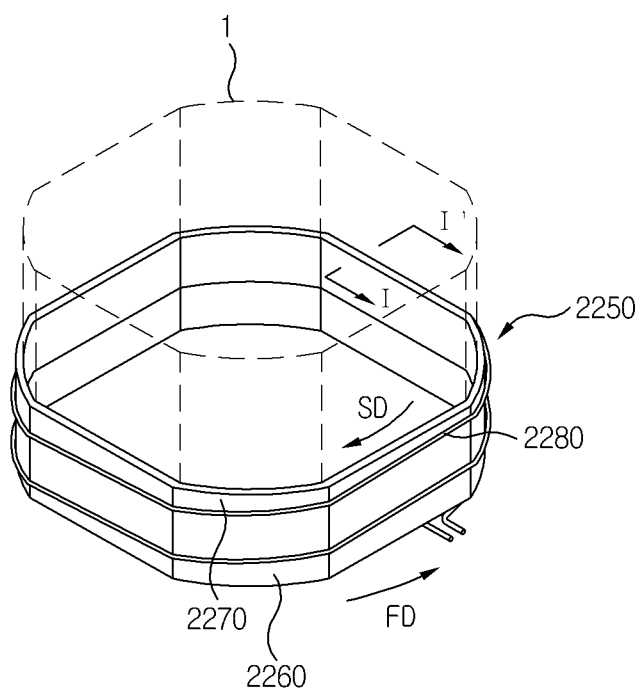
FIG. 12 is a perspective view of a coil block for VCM according to an exemplary embodiment of the present disclosure.
Figure 13:
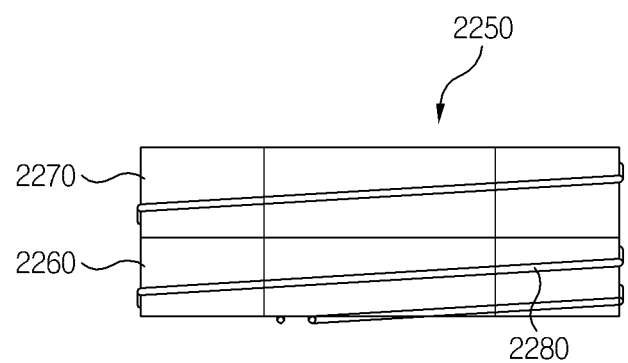
FIG. 13 is a lateral view of FIG. 12.
Figure 14:
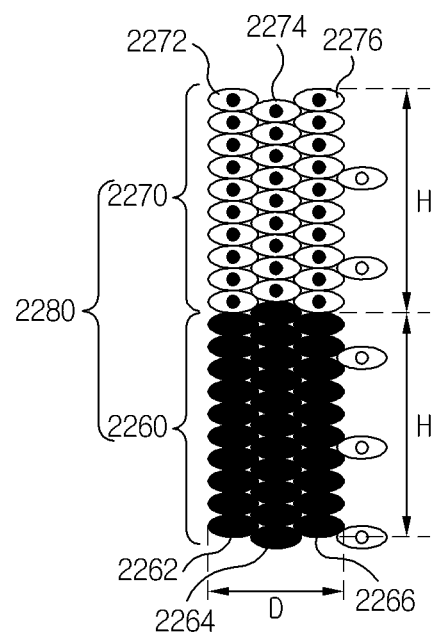
FIG. 14 is a cross-sectional view cut along line 1-1' of FIG. 12.
Figure 15:
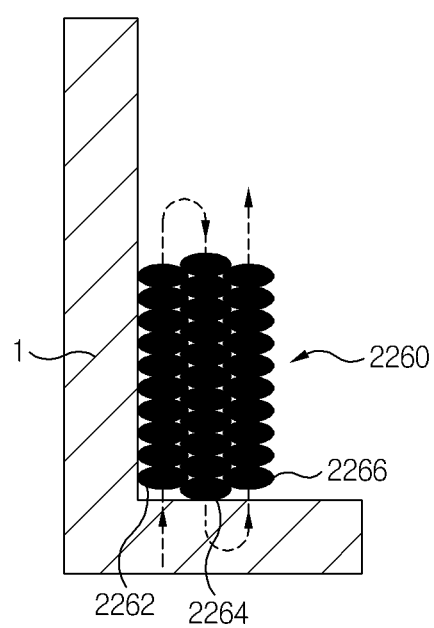
FIG. 15 to FIG. 18 illustrates cross-sectional views illustrating a method of manufacturing a VCM.

FIG. 12 is a perspective view of a coil block for VCM according to an exemplary embodiment of the present disclosure, FIG. 13 is a lateral view of FIG. 12, FIG. 14 is a cross-sectional view cut along line 1-1' of FIG. 12, and FIG. 15 through FIG. 18 are cross-sectional views illustrating a method of manufacturing a VCM.

Referring to FIGS. 12, 13 and 14, a coil block for VCM (2250, hereinafter referred to as coil block) is formed with a shape of a cylinder having a hollow hole.

The cylindrical coil block (2250) includes a first coil unit (2260), a second coil unit (2270) and a third coil unit (2280). In the present exemplary embodiment of the present disclosure, the first, second and third coil units (2260, 2270, 2280) are formed by winding a long wire insulated with an insulation resin such as enamel resin in a cylindrical shape.

The first coil unit (2260) is formed by winding the wire from a bottom peripheral surface of a cylindrical member (2001) for embodying the first coil unit (2260) to a first direction (FD) along a periphery of the member (2001). In the present exemplary embodiment of the present disclosure, the first direction (FD) is a clockwise direction, for example.

The first coil unit (2260) may be wound in N numbers of layers on the periphery of the member (2001) where N is an odd number. In the present exemplary embodiment of the present disclosure, the first coil unit (2260) is wound in three layers, for example. Hereinafter, each layer of the first coil layer (2260) wound in three layers is defined as a first coil layer (2262), a second coil layer (2264) and a third coil layer (2266), where the first coil unit (2260) is indicated as a symbol of "•" in FIG. 13.

Referring to FIG. 14, the first coil layer (2262) is wound upwards from a bottom end of the member (2001) to a half point of height of the member (2001) in the first direction (FD). The second coil layer (2264) is wound from approximately half the height of the member (2001) to a bottom end of the member (2001) along an upper surface of the first coil layer (2262) in the first direction (FD). The third coil layer (2266) is wound upwards from the bottom end of the member (2001) to approximately half the height of the member (2001) along the upper surface of the second coil layer (2264) in the first direction (FD).

The second coil unit (2270) is arranged on the first coil layer (2260). The second coil unit (2270) is formed by winding the wire forming the first coil unit (2260) along the periphery of the member (2001) to a second direction (SD) which is an opposite direction of the first direction (FD). The second direction (SD) in the present exemplary embodiment of the present disclosure is a counterclockwise direction.

The second coil unit (2270) may be wound from the upper surface of the first coil unit (2260) in N layers, where N is an odd number.

In the third exemplary embodiment of the present disclosure, the second coil unit (2270) is wound in three layers which are the same as those of the first coil layer (2260).

Hereinafter, each layer of the second coil layer (2260) wound in three layers is defined as a fourth coil layer (2272), a fifth coil layer (2274) and a sixth coil layer (2276), where the second coil unit (2260) is indicated as a symbol of "⊙".

Figure 16:
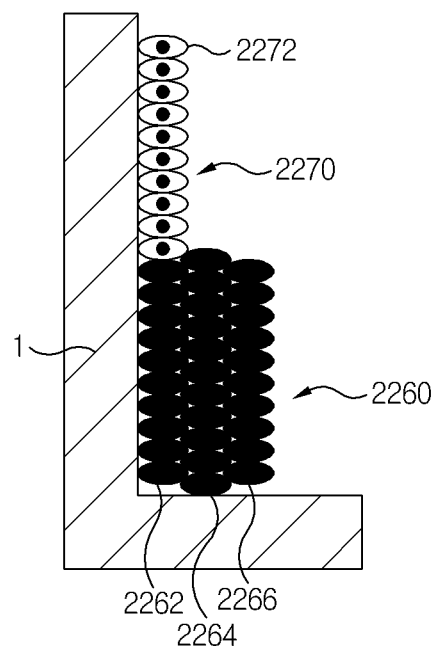

Referring to FIG. 16, the fourth coil layer (2272) is wound from the upper surface of the first coil layer (2260) in the second direction (SD), and a wound height of the fourth coil layer (2272) is substantially same as that of the first coil layer (2262).

Figure 17:
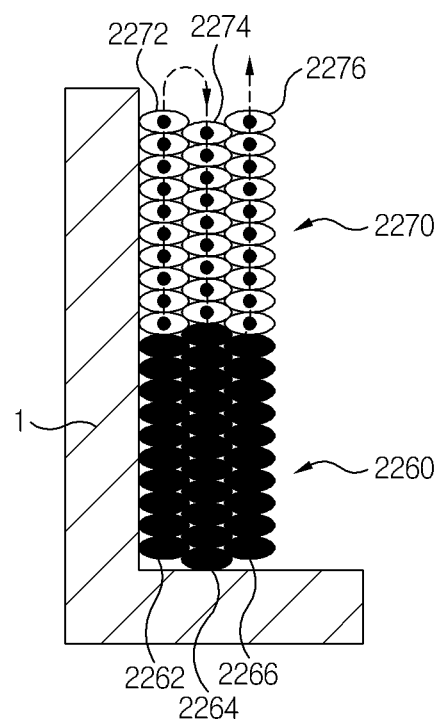

Referring to FIG. 17, the fifth coil layer (2274) is wound up to the upper surface of the first coil unit (2260) along the supper surface of the fourth coil layer (2272) to the second direction (SD). A wound height of the fifth coil layer (2274) is substantially same as that of the second coil layer (2264).

The sixth coil layer (2276) is wound up to the upper surface of the first coil unit (2260) along the upper surface of the fifth coil layer (2274) to the second direction (SD). A wound height of the sixth coil layer (2276) is substantially same as that of the third coil layer (2266).

In the third exemplary embodiment of the present disclosure, both the second coil unit (2270) and the first coil unit (2260) are wound in the same number of layers. The second coil unit (2270) and the first coil unit (2260) wound in the same number of layers may be formed with the same thickness (D) and the same height.

The third coil unit (2280) is formed by winding the wire forming the second coil unit (2270) to the second direction (SD) on the first and second coil units (2260, 2270), and the third coil unit (2280) is indicated as a symbol of "⊙".

Figure 18:
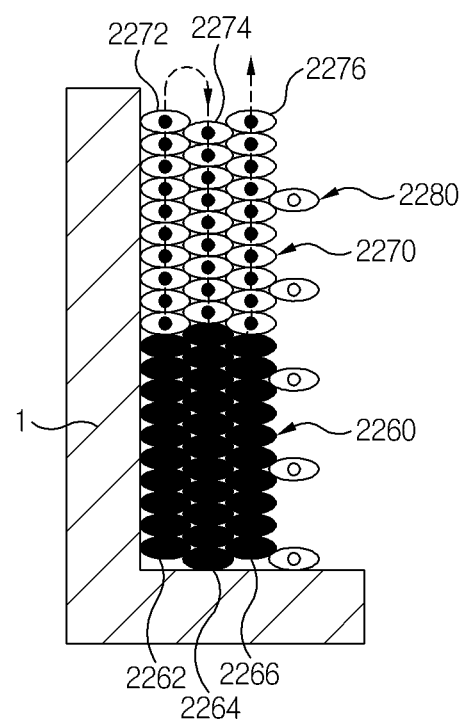

Referring to FIG. 18, the third coil unit (2280) is diagonally wound on the first and second coil units (2260, 2270), and the diagonally wound third coil unit (2280) may be wound in the mutually same gap. A distal end of the third coil unit (2280) may be arranged on a position near to a distal end (finishing unit) where the first coil unit (2260) starts.

In the exemplary embodiment of the present disclosure, the coil block (2250) is made to flow a current therein by applying a voltage having a voltage difference to the distal end of the first coil unit (2260) and the distal end of the third coil unit (2280), or grounding any one distal end of the first and second coil units (2260, 2270) and applying a voltage to the remaining distal end of the first and second coil units (2260, 2270).

A first magnetic field is generated from the first coil unit (2260) by a direction of the current flowing in the coil block (2250), a second magnetic field whose direction is opposite to that of the first coil unit (2260) is generated from the second coil unit (227), and a first magnetic field is generated by the third coil unit (2280).

Figure 19:
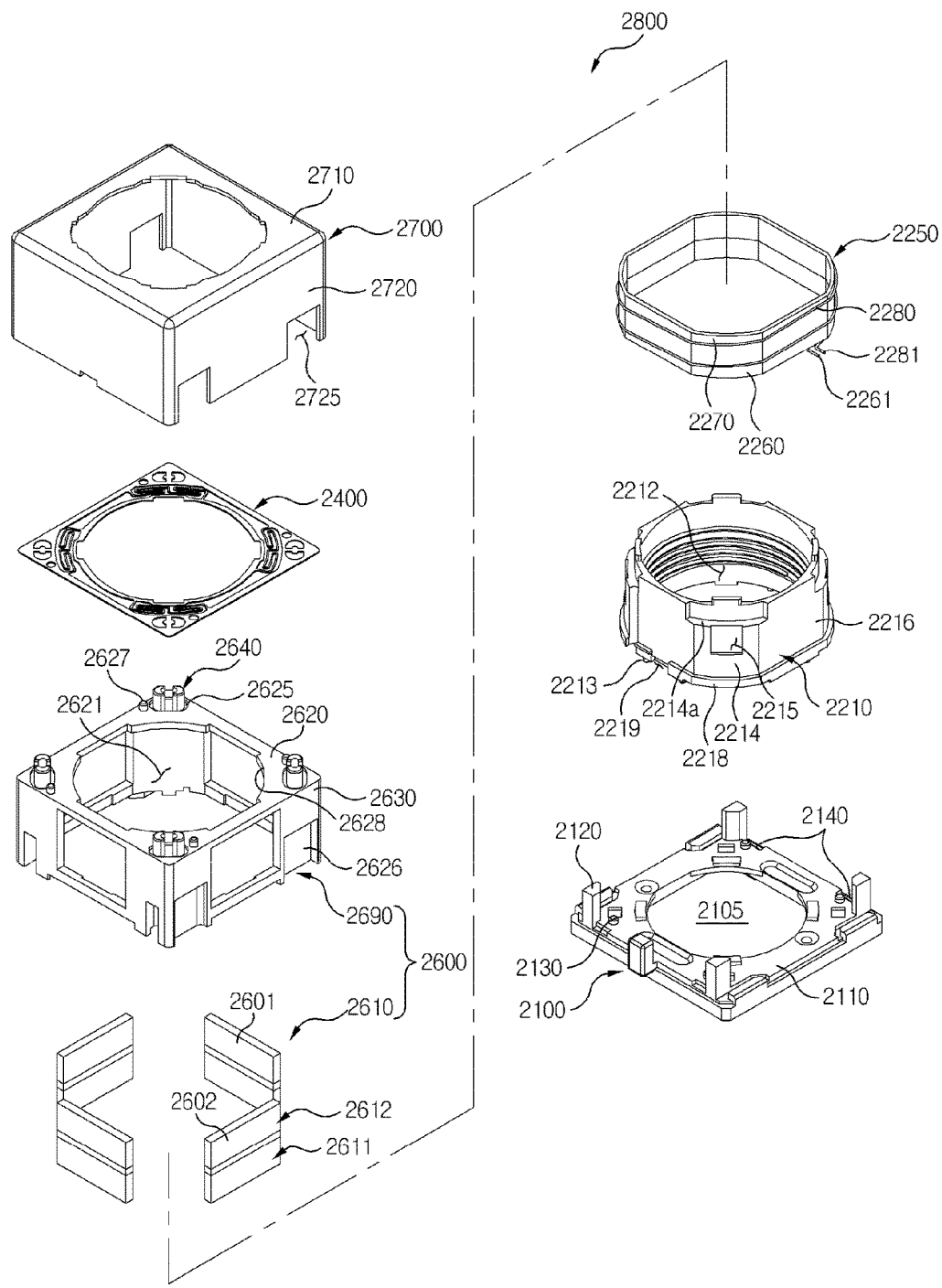
FIG. 19 is an exploded perspective view of a VCM according to an exemplary embodiment of the present disclosure.
Figure 20:
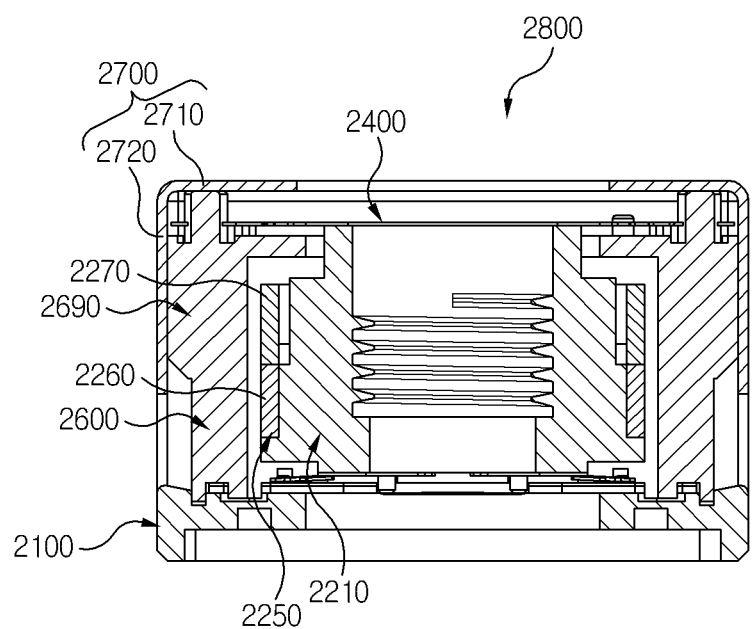
FIG. 20 is an assembled cross-sectional view of FIG. 19.

FIG. 19 is an exploded perspective view of a VCM according to an exemplary embodiment of the present disclosure, and FIG. 20 is an assembled cross-sectional view of FIG. 19.

Referring to FIGS. 19 and 20, a VCM (2800) includes a bobbin (2200), a coil block (2500), elastic members (300, 400) and a stator (2600). The VCM (2800) may further include a base (2100) and a cover can (700). The bobbin (2210) takes the shape of a cylinder having a hollow hole (2212), and is mounted therein with a lens (not shown).

A periphery of the bobbin (2210) is alternatively formed with a curvature unit (2214) and a planar unit (2216). In the exemplary embodiment of the present disclosure, four curvature units (2214) and four planar units (2216) are alternatively formed.

The curvature unit (2214) formed at the periphery of the bobbin (2210) is formed with a bond tank (2215) for securing a coil block (2250, described later), where the bond tank (2215) takes the shape of a concaved recess from the curvature unit (2214).

Although the exemplary embodiment of the present disclosure has described and explained that the bond tank (2215) is formed at the curvature unit (2214), the configuration is not limited thereto. For example, it should be apparent that the bond tank (2215) may be formed at the planar unit (2216).

Meanwhile, a part of an upper end of the each curvature unit (2214) formed at the periphery of the bobbin (2210) is cut out to allow a hitching sill (2214a) to be formed on the curvature unit (2214) of the bobbin (2210), where the bond tank (2215) communicates with the hitching sill (2214a).

At a bottom peripheral distal end of the bobbin (2210) is formed with a support unit (2218) for supporting the coil block (2250, described later), where the support unit (2218) is protruded in the shape of a rib along the bottom peripheral distal end of the bobbin (2210). A part of the support unit (2218) may include a partially cut-out unit (2219) to allow both distal ends of the coil block (2250) to pass therethrough.

The coil block (2250) takes the shape of a cylinder and is formed by winding a wire coated with insulation resin such as enamel resin in the shape of a cylinder. The coil block (2250) includes a first coil unit (2260) formed by winding the wire from a bottom peripheral surface of the bobbin (2210) to a first direction, a second coil unit (2270) arranged on the first coil unit (2260) wound in a direction opposite to the first direction, and a third coil unit (2280) diagonally wound on the first and second coil units (2260, 2270).

The first, second and third coil units (2260, 2270, 2280) forming the coil block (2250) is formed by winding one wire, where a current flows in the first coil unit (2260) to the first direction, a current flows in the second coil unit (2270) to a direction opposite to the first direction, and a current flows in the third coil unit (2280) to the first direction.

Thus, a first magnetic field is generated from the first coil unit (2260) where a current flows to the first direction, a second magnetic field whose current direction is opposite to that of the first coil unit (2260) is generated from the second coil unit (2227), and a first magnetic field is generated by the third coil unit (2280). The first coil unit (2260) and the second coil unit (2270) of the coil block (2250) are formed with the same thickness and same height, and the diagonally wound third coil unit (2280) is formed with the same angle and same gap.

The coil block (2250) including the first, second and third coil units (2260, 2270, 2280) may be wound on a member having a similar shape as that of the bobbin (2210), and inserted into the periphery of the bobbin (2210). Alternatively, the coil block (2250) may be directly wound on the periphery of the bobbin (2210).

The coil block (2250) wound on the periphery of the bobbin (2210) is bonded to the bobbin (2210) by an adhesive provided from a bond tank (2215).

A distal end (2261) of the first coil unit (2260) of the coil block (2250) arranged on the periphery of the bobbin (2210) and a distal end (2281) of the third coil unit (2280) are protruded to a bottom surface of the bobbin (2210) through the cut-out unit (2219) of the support unit (2218) formed at the bobbin (2210). The distal ends (2261, 2281) of the first and third coil units (2260, 2280) of the coil block (2250) protruded to the bottom surface of the bobbin (2210) through the cut-out unit (2219) of the support unit (2218) are electrically connected to a pair of first elastic members (2300) in elastic members (2300, 2400, described later).

The elastic members (2300, 2400) include first and second elastic members (2300, 2400), where the first elastic member (2300) is coupled to the bottom surface of the bobbin (2210) and the second elastic member (2400) is arranged on an upper surface of the bobbin (2210).

The pair of first elastic members (2300) is arranged at the bottom surface of the bobbin (2210). The pair of first elastic members (2300) serves to elastically support the bottom surface of the bobbin (2210). Each of the pair of first elastic members (2300) arranged on the bottom surface of the bobbin (2210) is mutually discrete to be free from mutual electrical contact. The pair of first elastic members (2300) arranged on the bottom surface of the bobbin (2210) may be formed by etching process or press work on a conductive metal plate.

Each of the pair of first elastic members (2300) is symmetrically formed about the bobbin (2210). Each of the pair of first elastic members (2300) includes an inner elastic unit (2302), an external elastic unit (2304) and a connection elastic unit (2306).

Each of the inner elastic units (2302) takes the shape of a semi-circular plate when viewed in a top plan view, and is formed with a through hole (2303) coupled to a boss (2213) formed at the bottom surface of the bobbin (2210). The inner elastic units (2302) are secured to the bottom surface of the bobbin (2210).

Each of the inner elastic units (2302) is electrically connected to the distal ends (2261, 2281) of the first and third elastic units (2260, 2280) of the coil block (2250). For example, each of the inner elastic units (2302) is electrically connected to the distal ends (2261, 2281) of the first and third elastic units (2260, 2280) of the coil block (2250) using a solder.

Each of the external elastic units (2304) is arranged on the periphery of the inner elastic unit (2302), and takes the shape of a semi-circular plate when viewed in a top plan view. Each of the external elastic units (2304) is formed with a through hole (2305) coupled to a boss (2130) coupled to an upper surface (2110) of the base (2100, described later).

Each of the connection elastic units (2306) elastically connects the inner elastic units (2302) and the external elastic units (2304), and may take the shape of a zigzag when viewed in a top plan view.

In the exemplary embodiment of the present disclosure, the first elastic member (2300) is formed with a terminal unit (2310) for electrically connected to an external circuit board. An electrical signal provided to the terminal unit (2310) is provided to the distal ends (2261, 2281) of the first and third elastic units (2260, 2280) of the coil block (2250) through the pair of first elastic member (2310), whereby magnetic fields are generated from the coil block (2250).

Meanwhile, the second elastic member (2400) may be elastically coupled to the upper surface of the bobbin (2210), and is coupled to a stroke lug (2640) formed at a housing (2690) of the stator (2600, described later). The stator (2600) includes a flat magnet (2610) and the housing (2690).

The flat magnet (2610) is arranged opposite to the coil block (2250) wound on the bobbin (2210), and includes a stacked first magnet (2611) and second magnet (2612), where four flat magnets (2610) including the first and second magnets (2611, 2612) mutually and perpendicularly arranged about the bobbin (2210).

Each of the first and second magnets (2611, 2612) takes the shape of a rectangular plate having mutually facing long sides and mutually facing short sides (2614).

In the exemplary embodiment of the present disclosure, a side of the flat magnet (2610) opposite to the coil block (2250) is defined as a front side (2601), and a side opposite to the front side of the flat magnet (2610) is defined as a rear side (2602). In the exemplary embodiment of the present disclosure, a first magnet (2611) of the flat magnet (2610) is arranged on a position opposite to the first coil unit (2260) of the coil block (2250), and a second magnet (2612) is arranged on a position opposite to the second coil unit (2270) of the coil block (2250).

The housing (2690) serves to secure the flat magnet (2610) so that the flat magnet (2610) faces the coil block (2250). In the exemplary embodiment of the present disclosure, the housing (2690) takes the shape of a bottom surface-opened rectangular parallelepiped box.

The housing (2690) includes an upper plate (2620) and a lateral plate (2630), where the flat magnet (2610) is secured at each lateral plate (2630). The upper plate (2620) of the housing (2690) takes the shape of a square plate, for example, and is centrally formed with an opening (2621) that exposes a lens mounted at the bobbin (2210). Each of the lateral plates (2630) of the housing (2690) is extended from four edges of the upper plate (2620) to a direction encompassing the bobbin (2210), whereby the housing (2690) takes the shape of a rectangular parallelepiped box that has an opened bottom.

Meanwhile, a stopper unit (2628) is exposed from an inner lateral surface formed by the opening (2621) formed on the upper plate (2620), and the stopper unit (2628) is formed at a position corresponding to each hitching sill (2214a) formed on the curvature unit (2214) at the periphery of the bobbin (2210). The stopper unit (2628) is brought into contact with the hitching sill (2214a) of lifted bobbin (2210) to restrict a stroke length of the bobbin (2210).

In the exemplary embodiment of the present disclosure, the stopper unit (2628) may take the shape of a curve surface having a similar or same curvature as that of the periphery of the bobbin (2210), when viewed in a top plan view.

Stroke lugs (2640) are protruded from the upper plate (2620) of the housing (2690). Each of the stroke lugs (2640) is formed at a corner on a diagonal direction of the upper plate (2620), and may be formed at each corner of the upper plate (2620). The stroke lugs (2640) function to obtain a stroke space for the bobbin (2210) and to secure the second elastic member (2400).

Each of the stroke lugs (2640) formed at each corner of the upper plate (2620) is formed in a pair, and the pair of stroke lugs (2640) is mutually symmetrically formed about the center of the stroke lugs (2640). In the exemplary embodiment of the present disclosure, the pair of stroke lugs (2640) may take the shape similar to a semi-circular pillar. Alternatively, the pair of stroke lugs (2640) may take various shapes including a rectangular pillar, a polygonal pillar and the like.

Although the exemplary embodiment of the present disclosure has explained and illustrated the pair of stroke lugs (2640) each formed at each corner of the upper plate (2620) of the housing (2690) in a mutually symmetrical manner, the configuration is not limited thereto. It should be apparent that the pair of stroke lugs (2640) may be formed at each corner of the upper plate (2620) of the housing (2690) in a mutually asymmetrical manner.

Meanwhile, a trench-shaped bond tank unit (625) is formed on the upper plate (2620) of the housing (2690) along a periphery of the stroke lug (2640), and the bond tank unit (625) is provided with an adhesive, where the second elastic member (2400) is adhered to the upper plate (2620) of the housing (2690) using the adhesive.

A coupling lug (2627) is formed at a position near to the stroke lug (2640) of the upper plate (2620) at the housing (2690). The coupling lug (2627) is formed at a position near to each stroke lug (2640).

The coupling lug (2627) is coupled to the housing (2690) to a direction designated by the second elastic member (2400), and each coupling lug (2627) diagonally formed at the upper plate (2620) of the housing (2690) is asymmetrically formed based on the center of the upper plate (2620) in order to prevent the second elastic member (2400) from being coupled to a not-designated direction.

Each center of the lateral plate (2630) of the housing (2690) is formed with an accommodation hole (2635) that penetrates each lateral plate (2630), and the flat magnet (2610) is coupled to the lateral plate (2630) of the housing (2690) using the accommodation hole (2635).

The lateral plate (2630) of the housing (2690) is formed with coupling grooves (2626) coupled to coupling pillars (2110) formed at each corner of the upper surface (110) of the base (2100, described later). A socket groove (2638) is formed across the accommodation hole (2635) of the pair of lateral plate (2630) opposite to the lateral plate (2630) of the housing (2690), and the socket groove (2638) is used to allow the VCM (2800) to be coupled to a socket of an external circuit board.

The cover can (2700) includes a cover can upper plate (2710) and a cover can lateral plate (2720). In the exemplary embodiment of the present disclosure, the cover can (2700) may be formed by processing a metal plate capable of blocking a magnetic field or blocking a hazardous electromagnetic wave.

The cover can upper plate (2710) includes an opening corresponding to the hollow hole of the bobbin (2210), and an inner lateral surface of the cover can upper plate (2710) is brought into contact with an upper surface of each stroke lug (2640) protruded from each corner of the upper plate (2620) of the housing (2690).

The cover can lateral plate (2720) is extended from an edge of the cover can upper plate (2710) to a direction encompassing the lateral plate (2630) of the housing (2690), and is brought into contact with a rear surface (2602) of each flat magnet (2610) coupled to the accommodation hole (2635) of the lateral plate (2630) at the housing (2690).

The flat magnet (2610) is prevented from moving backward or forward from the lateral plate (2630) of the housing (2690) by the contact between the rear surface (2602) of the flat magnet (2610) and the inner lateral surface of the cover can lateral plate (2720).

The cover can lateral plate (2720) blocks a magnetic field leaked from the flat magnet (2610) or a hazardous electromagnetic wave. The rear surface (2602) of the flat magnet (2610) and the cover can lateral plate (2720) may be mutually bonded by a bond.

In a case the lateral plate (2630) of the housing (2690) is formed with the socket groove (2638), the cover can lateral plate (2720) encompassing the lateral plate (2630) of the housing (2690) is formed with a cut-out unit (2725) exposing the socket groove (2638).

The base (2100) functions to secure the bobbin (2210), the first elastic member (2300), the stator (2600) and the cover can (2700). The base (2100) takes the shape of a rectangular parallelepiped centrally formed with an opening (2105), and is mounted at a rear surface thereof with an image sensor module (not shown). The base (2100) may be formed at the rear surface thereof with an infrared (IR) filter arranged at the front side of the image sensor module. The IR filter functions to remove the infrared included in the outside light.

An upper surface (2110) opposite to the rear surface of the base (2100) is arranged with a rear surface of the bobbin (2210) coupled to the first elastic member (2300). Four corners of the upper surface (2110) of the base (2100) are formed four coupling pillars (2120) perpendicularly protruded relative to each upper surface (2110), and each coupling pillar (2120) is coupled to the housing (2690).

The upper surface (2110) of the base (2100) is formed with bosses (2130) coupled to the first elastic member (2300). Furthermore, the base (2100) is formed with through holes (2140) through which the terminal units (2310) formed at the first elastic member (2300) pass.

As apparent from the foregoing, the present disclosure has an advantageous effect in that the coil block is formed with the same thickness to enhance the utilization of space, and to increase the electrostatic force by forming the coil block with first and second coil units each wound in mutually different directions and forming a diagonally wound third coil unit on a surface of the first and second coil units.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A VCM (Voice Coil Motor), the VCM comprising:
 a base;
 a housing disposed on the base and coupled to the base;
 a magnet disposed on the housing;
 a bobbin including a support unit protruded from a periphery of a lower portion of the bobbin, wherein a portion of the support unit is formed with a first groove, and the first groove is extended to a lower surface of the bobbin;
 a coil block arranged at a periphery of the bobbin and facing the magnet, and supported by the support unit;
 a first elastic member supporting a lower portion of the bobbin;
 a second elastic member supporting an upper portion of the bobbin; and
 a cover can covering the housing, and including an upper plate formed with an opening and a lateral plate extended from an edge portion of the upper plate towards the base, and coupled to the base,
 wherein the first elastic member is formed in a pair having a first member and a second member physically separated from the first member,
 wherein a first distal end of the coil block passes through the first groove of the bobbin and is connected to the first member of the first elastic member, and
 wherein a second distal end of the coil block is connected to the second member of the first elastic member.

2. The VCM of claim 1, wherein each of the first and second members includes an inner portion coupled to the bobbin, an outer portion arranged between the housing and the base, and a connection portion connecting the inner portion to the outer portion.

3. The VCM of claim 2, wherein a first hole is formed at the outer portion of the first elastic member corresponding to a first protrusion formed at an upper surface of the base.

4. The VCM of claim 3, wherein a second protrusion is protruded along the periphery of the bobbin.

5. The VCM of claim 4, wherein the bobbin further includes a third protrusion at a lower surface thereof, wherein a second hole is formed at an inner portion of the first elastic member corresponding to the third protrusion, and wherein the third protrusion and the second hole are mutually coupled.

6. The VCM of claim 3, wherein the bobbin comprises a plurality of second protrusions intermittently protruded along the periphery of the bobbin.

7. The VCM of claim 3, wherein the outer portion of the first member includes a first terminal, wherein the outer portion of the second member includes a second terminal, and wherein the first and second terminals each is configured to receive an external electric power.

8. The VCM of claim 7, wherein each of the first and second terminals is connected to a PCB through the base.

9. The VCM of claim 3, wherein the housing is formed with a second groove corresponding to the first protrusion.

10. The VCM of claim 1, wherein the magnet includes four magnets each having a plate shape, and is coupled to the cover can.

11. The VCM of claim 1, wherein the periphery of the bobbin is alternately formed with a curvature unit and a planar unit.

12. The VCM of claim 11, wherein the bobbin further includes a second groove between the curvature unit and the planar unit at an external surface thereof.

13. The VCM of claim 1, wherein the coil block includes a plurality of coil layers.

14. The VCM of claim 1, wherein each of the distal ends of the coil block is connected to the first and second members by soldering, respectively.

15. The VCM of claim 1, wherein the housing comprises an upper surface formed with a second opening corresponding to the first opening of the cover can, and a lateral surface extended in a direction from an edge of the upper surface towards the base, wherein the magnet is arranged at the lateral surface of the housing.

16. The VCM of claim 15, wherein the magnet is secured to a recess portion formed at the lateral surface of the housing.

17. The VCM of claim 1, wherein the first groove is formed concavely from the periphery of the bobbin.

18. The VCM of claim 1, wherein the base includes a coupling pillar formed at an upper surface thereof, and the coupling pillar is coupled to the housing.

19. A camera, the camera comprising an image sensor module, an infrared (IR) filter, and a Voice Coil Motor (VCM), wherein the VCM comprises:
- a base;
- a housing disposed on the base and coupled to the base;
- a magnet disposed on the housing;
- a bobbin including a support unit protruded from a periphery of a lower portion of the bobbin, wherein a portion of the support unit is formed with a first groove, and the first groove is extended to a lower surface of the bobbin;
- a coil block arranged at a periphery of the bobbin and facing the magnet, and supported by the support unit;
- a first elastic member supporting a lower portion of the bobbin;
- a second elastic member supporting an upper portion of the bobbin; and
- a cover can covering the housing, and including an upper plate formed with an opening and a lateral plate extended from an edge portion of the upper plate towards the base, and coupled to the base, wherein the first elastic member is formed in a pair having a first member and a second member physically separated from the first member, wherein a first distal end of the coil block passes through the first groove of the bobbin and is connected to the first member of the first elastic member, and wherein a second distal end of the coil block is connected to the second member of the first elastic member.

20. A mobile phone comprising the camera of claim 19.

* * * * *